United States Patent [19]

Najjar et al.

[11] Patent Number: 4,801,438

[45] Date of Patent: Jan. 31, 1989

[54] PARTIAL OXIDATION OF SULFUR-CONTAINING SOLID CARBONACEOUS FUEL

[75] Inventors: Mitri S. Najjar, Hopewell Junction; Roger J. Corbeels, Wappingers Falls, both of N.Y.

[73] Assignee: Texaco Inc., White Plains, N.Y.

[21] Appl. No.: 62,018

[22] Filed: Jun. 15, 1987

Related U.S. Application Data

[63] Continuation-in-part of Ser. No. 20,307, Mar. 2, 1987.

[51] Int. Cl.$^4$ ................ B01D 53/06; C10K 1/18; C10K 1/26
[52] U.S. Cl. ................ 423/230; 48/197 R; 48/201; 48/202; 252/373; 423/415 A; 423/648.1
[58] Field of Search .......... 423/223, 230, 572, 415 A, 423/648 R, 650; 252/373; 48/197 FM, 199 FM, 197 R, 201, 202

[56] References Cited

U.S. PATENT DOCUMENTS

| | | | |
|---|---|---|---|
| 2,830,883 | 4/1958 | Eastman | 423/415 A |
| 2,987,386 | 6/1961 | Chapman et al. | 423/415 A |
| 3,977,844 | 8/1976 | Van Slyke | 252/373 |
| 4,007,018 | 2/1977 | Slater et al. | 48/215 |
| 4,026,679 | 5/1977 | Collin | 252/373 |
| 4,328,008 | 5/1982 | Muenger et al. | 48/206 |
| 4,370,161 | 1/1983 | Turkdogan | 423/230 |

FOREIGN PATENT DOCUMENTS

54-202 5/1978 Japan ................ 48/201

OTHER PUBLICATIONS

The Merck Index, 8th ed., Stecher et al, eds., Merck & Co., Inc., 1968, pp. 190, 192.

Perry's Chemical Engineers' Handbook, 6th ed., Perry et al, eds., McGraw-Hill Book Co., 1984, pp. 23-63.

*Primary Examiner*—Robert L. Stoll
*Assistant Examiner*—Jeffrey Edwin Russel
*Attorney, Agent, or Firm*—Robert A. Kulason; James J. O'Loughlin; Albert Brent

[57] ABSTRACT

A process for the simultaneous partial oxidation and desulfurization of an ash-containing solid carbonaceous fuel comprising (basis solid fuel) 0.2 to 6.0 wt. % sulfur and 0.1 to 30 wt. % of silicate compounds for the production of gaseous mixtures comprising $H_2$ and CO and entrained molten slag. In the process, the solid carbonaceous fuel and first and second types of supplemental calcium-containing materials are reacted by partial oxidation in the reaction zone of a free-flow unobstructed down-flowing vertical refractory lined gas generator with a controlled amount of free-oxygen containing gas and a temperature moderator so that an equilibrium oxygen concentration is provided in the gas phase in the reaction zone having a partial pressure which is less than about $10^{-9}$ atmospheres. The partial oxidation and desulfurization reactions take place simultaneously at a temperature above about 1900° F. and about 10° to 100° F. above the fluid temperature of the slag at an increased thermal efficiency. The sulfur in the solid carbonaceous fuel in the reaction zone is converted into calcium and iron sulfide particulate matter which leaves the reaction zone along with the silicates of calcium and iron in the molten ash that is entrained in the hot raw effluent gas stream. Additional desulfurization in a fluidized bed containing calcium-containing material in admixture with carbon-containing material may be used to reduce the amount of $H_2S$ and COS in the effluent gas stream to less than about 0.05 volume %.

11 Claims, No Drawings

PARTIAL OXIDATION OF SULFUR-CONTAINING SOLID CARBONACEOUS FUEL

This is a continuation-in-part of copending application Ser. No. 20,307, filed Mar. 2, 1987.

FIELD OF THE INVENTION

This invention pertains to the simultaneous partial oxidation and desulfurization of a sulfur and silicate-containing solid carbonaceous fuel. More particularly, it pertains to a process for the partial oxidation of a sulfur and silicate-containing carbonaceous fuel for the production of gaseous mixtures comprising $H_2$ and CO and containing less than about 0.05 volume % of $H_2S$ and COS.

It would be highly desirable to use comparatively low-cost readily available sulfur and silicate-containing solid carbonaceous fuels such as coal, lignite, petroleum coke and mixtures thereof for the production of gaseous mixtures comprising $H_2+CO$. These gaseous mixtures are commonly known as synthesis gas, reducing gas, and fuel gas depending on the actual gaseous composition. For example synthesis gas comprises a specific $H_2/CO$ mole ratio, reducing gas has a high reducing ratio e.g. $H_2+CO/H_2O+CO_2$, and fuel gas contains supplemental $CH_4$ and has a relatively high heat content.

By conventional partial oxidation gasification processes, sulfur containing gases e.g. $H_2S$ and COS in the amount of about 0.1 to 2.0 mole % are produced along with the $H_2+CO$. These sulfur-containing gaseous impurities are undesirable. They corrode piping and equipment upon contact; and, they deactivate catalysts. Accordingly, raw gas streams from the reaction zone may require additional downstream gas purification in order to remove the sulfur-containing gases.

The need for means to remove a major portion of the sulfur in synthesis gas as generated by the partial oxidation process is widely recognized. In particular, removal of sulfur from synthesis gas at high temperature is of great interest. The combined-cycle thermal efficiency is improved by eliminating the need to cool the product gases prior to low-temperature acid-gas wet scrubbing. Gaseous impurities, including $H_2S$, COS and $CO_2$ are removed from raw synthesis gas by low temperature condensation and by solvent absorption in a separate gas purification operation located downstream from the gas generator in coassigned U.S. Pat. No. 4,052,176. Further, in this process, it is necessary to cool the hot raw gas stream from a temperature of 2700° F. to $-70°$ F. before the sulfur-containing gas are separated.

Reference may be made to U.S. Pat. No. 4,599,955 which describes the use of an horizontal cyclone type furnace operating at a temperature of at least 2192° F. with a single sulfur fixing agent. Any iron present in the coal is reduced to elemental form. In contrast, advantageously the subject invention described herein employs a vertical free-flow unobstructed refractory lined generator operating in the slagging mode at a lower temperature and in an extremely reducing atmosphere. Two types of calcium-containing materials are reacted in the reaction zone. Further, the life of the refractory lining in the gas generator is increased. Also, iron is tied up in the molten ash as iron silicates and sulfides; and substantially no elemental iron is produced.

SUMMARY OF THE INVENTION

This invention relates to a process for the production of gaseous mixtures comprising $H_2+CO$ and containing a reduced amount of sulfur-containing gases e.g. $H_2S+COS$ by the simultaneous partial oxidation and desulfurization of a sulfur and silicate-containing comminuted solid carbonaceous fuel. In addition to carbon, the solid carbonaceous fuel comprises (basis solid fuel) about 0.2 to 6.0 wt. % sulfur and about 0.1 to 30 wt. % silicate compounds including iron silicate. An additional gas desulfurization step in a fluidized bed located downstream from the gas generator is provided in one embodiment of the subject invention. The fluidized bed contains a calcium-containing material and a carbon-containing material.

In the process, a sulfur and silicate-containing solid carbonaceous fuel and two different types of calcium-containing materials are reacted by partial oxidation in the reaction zone of a free-flow unobstructed downflowing vertical refractory lined gas generator with a controlled amount of free-oxygen containing gas and a temperature moderator so that an equilibrium oxygen concentration is produced in the gas phase in the reaction zone having a partial pressure which is less than about $10^{-9}$ atmosphere. Further, the total atoms of calcium in the reaction zone is at least equal to about 1.0 to 3.0 times the atoms of sulfur in the solid carbonaceous fuel plus the atoms of silicon in the ash. The partial oxidation and desulfurization reactions take place simultaneously at a temperature which is about 1900° F. and about 10° to 100° F. above the fluid temperature of the slag which has a viscosity in the range of about 1.0 to 2000 poises. The pressure in the reaction zone is in the range of about 2 to 250 atmospheres. Substantially no elemental iron is produced, and about 90 to 99.8 wt. % of the carbon in the original solid carbonaceous fuel is converted into carbonoxides e.g. CO and $CO_2$. About 10 to 99 wt. % of the sulfur in the solid carbonaceous fuel in the reaction zone is converted into calcium sulfide and iron sulfide particulate matter which leave the reaction zone in said molten slag entrained in the hot raw effluent gas stream comprising $H_2$, CO, $CO_2$, at least one gas selected from the group consisting of $H_2O$, $N_2$, $NH_3$, $CH_4H_2S$, COS and A; and entrained molten slag including calcium sulfide, iron sulfide, and the silicates of calcium. The cooled and cleaned product gas stream may contain less than 0.6 mole % of $H_2S$ and COS.

DISCLOSURE OF THE INVENTION

This invention relates to the partial oxidation of sulfur and silicate-containing solid carbonaceous fuels such as coal and petroleum coke, or mixtures thereof to produce synthesis gas reducing gas, or fuel gas which is substantially free from sulfur. More particularly, it pertains to a partial oxidation process employing an additive system for in-situ capturing the sulfur from the fuel at high temperature, and to a special gasifier operating mode to maximize the effectiveness of the additive. In the case of petroleum coke feedstocks, the additive system will also help with the removal of vanadium and nickel contaminants from the gasifier.

From the point of view of thermodynamics and cost, the addition of supplemental calcium-containing compounds to the partial oxidation gasifier has been found to be highly effective to capture the sulfur contained in sulfur and silicate-containing solid carbonaceous fuels.

Thermodynamics favor calcium, especially at low gasification temperatures, e.g. above about 1900° F. and about 10° to 100° F. above the fluid temperature of the slag. However, the syngas produced must have a sufficiently low oxygen potential for calcium to capture the sulfur. To produce a syngas with sufficiently low oxygen potential, the following methods of feeding may be used in the subject process: (1) gas-entrained feeding of solid carbonaceous fuel particulates; and (2) liquid hydrocarbonaceous fuel, liquid $CO_2$ or water slurry feeding with skimming of any $CO_2$ or $H_2O$ carrier. It has been found that by the subject process, a smaller amount of calcium is tied up in the silicate slag. Large amounts of the silicates of calcium adversely affect the slag viscosity, especially if metallic iron is also present. This difficulty is avoided in the subject invention by introducing calcium fluoride or calcium borate in addition to the other form of calcium. The fluorides and borates of calcium reduce the viscosity of the slag.

The sulfur and silicate-containing solid carbonaceous fuel feed materials in the subject process include by definition coal e.g. anthracite, bituminous, subbituminous, lignite, coke made from coal; petroleum coke; oil shale; tar sands; pitch; and mixtures thereof. In addition to carbon, solid carbonaceous fuel comprises (basis solid fuel) about 0.2 to 6.0 wt. % of sulfur and about 0.1 to 30 wt % of silicate compounds including iron silicate. The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 0.425 mm (Alternative No. 40). The moisture content of the solid carbonaceous fuel particles is in the range of about 0 to 10 wt. %, such as 2 to 5 wt. %. The feedstock may be dried when necessary.

The ground solid carbonaceous fuel is mixed with two types of calcium-containing materials. The first type of calcium-containing material is introduced to react with the sulfur-containing materials in the reaction zone to produce calcium sulfide thereby reducing the formation of sulfur-containing gases e.g. $H_2S$ and COS. The first type of calcium containing material is selected from the group consisting of calcium oxide, calcium hydroxide, calcium carbonate, calcium acetate, calcium formate, calcium hydride, calcium nitrate, calcium chloride and mixtures thereof. Line e.g. calcium oxide is the preferred first type of calcium-containing material. The second type of calcium-containing materials is selected from the group consisting of calcium fluoride, calium borate and mixtures thereof. The second type of calcium-containing materials is introduced to flux the silicates by forming the silicates of calcium. The viscosity of the molten slag is thereby reduced. The second type of calcium fluoride and/or calcium borate are introduced into the reaction zone to provide a concentration equal to about 0.1 to 10 wt. % of the silicates present in the reaction zone. The weight ratio of calcium fluoride to calcium borate may be in the range of about 0.5-2 to 1.0. The weight ratio of calcium from all sources to silicon in the reaction zone is in the range of about 3-1 parts by weight of calcium to one part by weight of silicon. Alternatively, the calcium-containing material may be mixed with the solid carbonaceous fuel before, during or after the solid carbonaceous fuel is ground. Sufficient first and second type of supplemental calcium-containing materials are introduced so that the total amount of calcium in the reaction zone comprising the atoms of calcium in the solid fuel and the atoms of calcium in the first and second types of supplemental calcium-containing material is in the range of about 1.0 to 3.0 times the atoms of sulfur in the solid carbonaceous fuel plus the atoms of silicon in the ash. Of the total amount of said first and second supplemental calcium-containing material introduced into the reaction zone from about 0.01 to 12.0 weight percent is supplied as said second supplemental calcium-containing material and the remainder comprises said first supplemental calcium-containing material.

The solid carbonaceous fuel in admixture with the first and second types of supplemental calcium-containing material is introduced into the reaction zone of a vertical refractory-lined, unobstructed, free-flow downflowing noncatalytic partial oxidation gas generator by way of a burner. In one embodiment said reaction zone is lined with a high chrome refractory comprising at least about 30 wt. % of chromium oxide, at least about 2.0 wt. % of magnesium oxide, and aluminum oxide in the range of about nil to 10 wt. %. This high chrome refractory has an improved resistance to attack by molten slag. Simultaneously, a stream of free-oxygen containing gas and a temperature moderator are introduced into the gas generator. Single and double annulus type burners for introducing the feedstreams into the partial oxidation gas generator are shown in coassigned U.S. Pat. Nos. 3,528,930 and 3,847,564, which are incorporated herein by reference. Typical partial oxidation gas generator processes employing gaseous and liquid $CO_2$-solid carbonaceous fuel feeds are shown in coassigned U.S. Pat. Nos. 3,976,442, and 3,976,443 respectively, and are incorporated herein by reference.

The mixture of solid carbonaceous fuel and calcium-containing material maybe introduced into the partial oxidation reaction zone as solid particles entrained in a gaseous medium e.g. steam, nitrogen, $H_2O$, $CO_2$, recycle synthesis gas, free-oxygen containing gas, and mixtures thereof. Alternatively, pumpable slurries of said mixture of solid carbonaceous fuel and calcium-containing material in a liquid carrier comprising a liquid hydrocarbonaceous fuel, water or liquid $CO_2$ may be introduced into the gas generator. For example, the liquid slurry may comprise 50-70 wt. % of solid carbonaceous fuel and calcium-containing material and the remainder is liquid $H_2O$ or $CO_2$. At least a portion of the $H_2O$ or $CO_2$ may be skimmed from the $H_2O$ or $CO_2$-solid fuel mixture prior to the mixture being introduced into the burner at a temperature in the range of about $-67°$ F. to 100° F. depending on the pressure. After skimming, the mixture of solid carbonaceous fuel and $H_2O$ or $CO_2$ contains about 10 to 20 wt. % of $H_2O$ or $CO_2$ (basis weight of feed). In another embodiment, the feedstream comprises slurry of liquid hydrocarbonaceous material and solid carbonaceous fuel.

The term liquid hydrocarbonaceous material as used herein to describe suitable liquid carriers is intended to include various materials, such a liquidified petroleum gas, petroleum distillates and residues, gasoline, naphtha, kerosene, crude petroleum, asphalt, gas oil, residual oil, tar sand oil, shale oil, coal derived oil, aromatic hydrocarbon (such as benzene, toluene, xylene fractions), coal tar, cycle gas oil from fluid-catalytic-cracking operation, furfural extract of coker gas oil, methanol, ethanol and other alcohols, by-product oxygen containing liquid hydrocarbons from oxo or oxyl synthesis, and mixtures thereof.

The partial oxidation reaction takes place in the reaction zone of the gas generator at a temperature which is above about 1900° F. and about 10° to 100° F. above the fluid temperature of the slag which has a viscosity in the range of about 1.0 to 2000 poises. The pressure in the reaction zone is in the range of about 2 to 250 atmosphere, say 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.3 to 1.5. The free-oxygen is intended to include air, oxygen-enriched air, i.e., greater than 21 mole % oxygen, and substantially pure oxygen, i.e. greater than 95 mole % oxygen, (the remainder comprising $N_2$ and rare gases). The free-oxygen containing gas and temperature moderator is provided in a controlled amount so that an equilibrium oxygen concentration is provided in the gas phase in the reaction zone having a partial pressure which is less than about $10^{-9}$ atmosphere. The weight ratio $H_2O$/solid carbonaceous fuel in the reaction zone is in the range of about 0.03 to 0.7. This range will prevent the calcium fluoride and calcium borate from being hydrolyzed to acids.

The raw product gas leaving the reaction zone may have the following composition in mole percent: $H_2$ 8 to 60, CO 8 to 70, $CO_2$ 1 to 20, $H_2O$ 1 to 40, $CH_4$ nil to 30, $H_2S$+COS 0.01 to 0.6, $N_2$ nil to 85 and A nil to 2.0. Molten slag is entrained in the hot raw effluent gas stream from the reaction zone.

Substantially no elemental iron is produced in the reaction zone; there is substantially no formation of additional calcium silicates; and about 90 to 98 wt. % of the carbon in the original solid carbonaceous fuel is converted into carbon oxides e.g. CO +$CO_2$. About 70 to 90 volume % of the carbon oxides comprises CO. About 10 to 99 wt. % of the sulfur in the solid carbonaceous fuel in the reaction zone is converted into calcium sulfide and iron sulfide particulate matter which leaves the reaction zone along with the molten slag entrained in the hot raw effluent gas stream. The remainder of the sulfur is converted into the sulfur-containing gaseous products e.g. $H_2S$ and COS. By definition, molten slag is the molten remnant of particles of the solid carbonaceous fuel which have been subjected to partial oxidation at a temperature above about 1900° F. It substantially comprises the fused reaction products of the first and second types of supplemental calcium-containing material and the mineral matter found originally in the solid carbonaceous fuel. On a dry basis, the slag may comprises in wt. %: $SiO_2$ 10 to 50, $Al_2O_3$ 10 to 50, iron oxides and iron sulfides 1.0 to 40, calcium oxides and sulfides 5 to 70, the silicates of calcium 5 to 70, and others. The slag particles in the bottom of the quench tank has a size in the range of about 0.001 to 6 inches.

In one embodiment, the hot raw effluent gas stream from the partial oxidation reaction may be cooled and cleaned by contact with a liquid hydrocarbonaceous fuel cooling and scrubbing agent in a conventional gas quench tank and/or in gas scrubbing equipment. For example, reference is made to coassigned U.S. Pat. No. 4,007,018, which is incorporated herein by reference. A slurry of slag comprising the sulfides of calcium and iron in liquid hydrocarbonaceous fuel is produced. After being steam stripped and separating $H_2S$; the sulfur-depleted slurry may be recycled to the front end of the process. There it is mixed with fresh sulfur and silicate containing solid carbonaceous fuel and make-up first and second calcium-containing material in the preparation of fresh feed mixture to the partial oxidation gas generator. The gaseous mixture of steam and $H_2S$ is then sent to a conventional sulfur-recovery facility; for example, a conventional Claus unit. In this embodiment, water was avoided as the cooling and scrubbing agent for the hot raw effluent gas stream from the gas generator in order to prevent the calcium sulfide entrained in the hot raw effluent gas stream from reacting with the water to produce unwanted $H_2S$ in the product gas. In another embodiment, the slag is separated from the cooling and scrubbing agent by conventional methods e.g. settling, screening, and filtration. The cooling and scrubbing agent may be then recycled, and the slag may be used as fill.

If necessary, further desulfurization of the raw effluent gas stream leaving the gas quench tank or gas scrubber may take place in a fluidized bed comprising 85 to 99 wt. % of calcium-containing material and the remainder comprising a carbon-containing material. The $H_2S$ +COS content in the raw effluent product gas stream may be thereby reduced to less than about 0.05 mole %. The calcium-containing material is selected from the group of calcium-compounds consisting of oxides, hydroxide, carbonates, acetate, formate, hydride, nitrate, chloride, and mixtures thereof. The carbon-containing material is selected from the group consisting of carbon, coal, petroleum coke, soot, carbonaceous particles that were entrained in the raw effluent gas stream from the partial oxidation reaction zone, and mixtures thereof. The fluidized bed may be regenerated by steam stripping. The overhead steam stripped gaseous stream comprising $H_2O$, $H_2S$ and COS may be sent to a conventional Claus Unit where elemental sulfur is produced.

In still another embodiment, the hot raw effluent gas stream from the reaction zone is split into first and second gas streams, such as in the manner described in coassigned U.S. Pat. No. 4,328,008, which is incorporated herein by reference. The first gas stream is cooled by indirect heat exchange with a coolant in a gas cooler and contains about 60 to 99.5 volume %, such as about 80 to 99 vol. % of the total hot raw effluent gas stream leaving the reaction zone of the partial oxidation gas generator. The first stream also contains less than about 10 wt. % of the entrained molten slag and particulate matter, e.g. about 0.1 to 6.0 wt. %.

The second split stream of raw synthesis gas includes the remainder of the slag, particulate matter, and sulfur from the reaction zone. The first split stream of raw synthesis gas, preferably at substantially the same temperature and pressure as in the reaction zone less ordinary drops in the lines, is passed through a fluidized bed of calcium-containing material and carbon-containing material, thereby reducing the amount of sulfur-containing materials in the first split gas stream.

In one embodiment, the desulfurized first hot raw gas stream leaving the fluidized bed is cooled and cleaned by contacting the gas stream with a liquid hydrocarbonaceous fuel cooling and scrubbing agent thereby producing a slurry comprising slag and calcium sulfide in liquid hydrocarbonaceous fuel. In the manner previously described, the slurry may be steam stripped to produce a sulfur-depleted slurry; and, steam and $H_2S$ is separated therefrom. Optionally, prior to being introduced into said fluidized bed, the first split gas steam may be cooled to a temperature in the range of about 1000° F. to 2200° F. by indirect heat exchange. Thereby, steam may be produced. The second split gas stream is passed through a pool of quench fluid contained in a quench tank. Most of the calcium sulfide and some of the iron sulfide in the slag in the second gas stream reacts with the quench water to produce $H_2S$. The second split gas stream containing said supplemental $H_2S$ leaves the quench tank and may be desulfurized. For example, the $H_2S$-enriched gas stream may be introduced into a conventional Claus Unit where elemental sulfur is produced. In a Claus Unit, a portion of the $H_2S$ in the $H_2S$-containing gas is burned with air to produce water and $SO_2$. A shift reaction then occurs between $SO_2$ and the remainder of the $H_2S$ to produce elemental sulfur and $H_2O$. The tail gas from the Claus unit is processed to a concentration of about 200 ppm of $H_2S$ and $SO_2$. Since the slag remaining in the bottom of the quench tank contains a reduced amount of sulfur, the slag is less hazardous. Further, any cost to pretreat the slag prior to disposal is thereby reduced.

In another embodiment, the desulfurized first split stream of synthesis gas leaving the aforesaid calcium and carbon-containing fluidized bed is cooled and scrubbed by direct contact with water in a gas cooling and scrubbing zone. Any sulfides of calcium and iron remaining in the first split gas stream react with the water to produce supplemental $H_2S$. The first split gas stream containing said supplemental $H_2S$ leaving the gas cooling and scrubbing zone is then sent to a conventional desulfurization zone where acid gases are removed, for example by a solvent absorbent.

Alternatively, the first split gas stream may be cooled by indirect heat exchange with a coolant before the gas scrubbing step. For example, the first split gas stream may be passed through a waste heat boiler to produce steam and then scrubbed with a liquid hydrocarbonaceous fuel.

Various modifications of the invention as herein before set forth may be made without departing from the spirit and scope thereof, and therefore, only such limitations should be made as are indicated in the appended claims.

We claim:

1. In a process for the simultaneous partial oxidation and desulfurization of a sulfur and silicate-containing comminuted solid carbonaceous fuel comprising, basis solid fuel, 0.2 to 6.0 wt. % sulfur and 0.1 to 30 wt. % of silicate compounds including iron silicate the improvements comprising: (1) reacting in the free-flow unobstructed down-flowing vertical refractory lined reaction zone of a partial oxidation gas generator a feed mixture comprising said solid carbonaceous fuel and first and second types of supplemental calcium-containing material with a controlled amount of free-oxygen containing gas and a temperature moderator so that an equilibrium oxygen concentration is provided in the gas phase in the reaction zone with a partial pressure which is less than about $10^{-9}$ atmospheres, the O/C atomic ratio is in the range of about 0.3 to 1.5, the $H_2O$/solid carbonaceous fuel weight ratio is in the range of about 0.03 to 0.70 the total atoms of calcium in the reaction zone is in the range of about 1.0 to 3.0 times the atoms of sulfur in the solid carbonaceous fuel plus the atoms of silicon in the ash, and about 90 to 99.8 wt. % of the carbon in said solid carbonaceous fuel is converted into carbon oxides, thereby producing a hot raw effluent gas mixture comprising $H_2$, CO, $CO_2$, at least one gas selected from the group consisting of $H_2O$, $N_2$, $CH_4$, $H_2S$, COS and A, and entrained molten slag including calcium sulfide, iron sulfide, and the silicates of calcium and iron; the partial oxidation and desulfurization reactions take place at a temperature which is above about 1900° F. and about 10° to 100° F. above the fluid temperature of the slag which has a viscosity in the range of about 1.0, to 2,000 poises, the pressure is in the range of about 2 to 250 atmospheres, and wherein substantially no elemental iron is produced, and at least about 10 to 99 wt. % of the sulfur in the solid carbonaceous fuel in the reaction zone is converted into said calcium sulfide and iron sulfide particulate matter which leave the reaction zone along with the silicates of calcium and iron in said molten slag and the remainder of the sulfur is converted into sulfur-containing gaseous products; and wherein said first type of supplemental calcium-containing materials is selected from the group consisting of calcium oxide, calcium hydroxide, calcium carbonate, calcium acetate, calcium formate, calcium hydride, calcium nitrate, calcium chloride, and mixtures thereof; said second type of supplemental calcium-containing material is selected from the group consisting of calcium fluoride, calcium borate, and mixtures thereof; and of the total amount of said first and second supplemental calcium-containing material added from about 0.01 to 12.0 weight percent is supplied as said second supplemental calcium-containing material and the remainder comprises said first supplemental calcium-containing material; (2) cooling and cleaning the hot raw effluent gas mixture from (1) by contacting said effluent gas mixture with a liquid hydrocarbonaceous fuel cooling and scrubbing agent, thereby producing a slurry comprising slag and calcium sulfide in liquid hydrocarbonaceous fuel; (3) steam stripping said slurry and separating a gaseous mixture comprising steam and $H_2S$; and (4) recycling the sulfur-depleted slurry to the front end of the process for use in preparation of fresh feed mixture to the partial oxidation gas generator.

2. The process of claim 1 wherein said sulfur and silicate-containing solid carbonaceous fuel is selected from the group consisting of coal, lignite, coke made from coal, petroleum coke, oil shale, tar sands, pitch, and mixtures thereof.

3. The process of claim 1 wherein said mixture of solid carbonaceous fuel and first and second types of supplemental calcium-containing materials is introduced downwardly into said reaction zone entrained in a gaseous or liquid carrier.

4. The process of claim 1 wherein said second type of calcium-containing material is introduced into the reaction zone in an amount equal to about 0.1 to 10 wt. % of the silicates present in the reaction zone; the weight ratio of calcium fluoride to calcium borate is in the range of about 0.5-2 to 1.0; and the weight ratio of calcium from all sources to silicon in the reaction zone is in the range of about 3-1 parts by weight of calcium to one part by weight of silicon.

5. The process of claim 1 wherein said solid carbonaceous fuel and said first and second types of supplemental calcium-containing material are introduced into the reaction zone as a slurry in a liquid hydrocarbonaceous fuel.

6. The process of claim 1 wherein said mixture of solid carbonaceous fuel and said first and second types of supplemental calcium-containing materials comprise a pumpable liquid slurry in a liquid carrier selected from the group consisting of liquid hydrocarbonaceous fuel, $H_2O$ and $CO_2$; and when said liquid carrier is $H_2O$ or $CO_2$ provided with the step of skimming at least a portion of the liquid $CO_2$ or water carrier prior to said mixture entering the reaction zone to reduce the amount of $CO_2$ or $H_2O$ entering the gas generator to about 10 to 20 wt. %.

7. The process of claim 1 provided with the steps of recovering sulfur from said gaseous mixture comprising steam and $H_2S$ from (3) in a Claus Unit.

8. The process of claim 1 wherein said reaction zone is lined with a high chrome refractory comprising at least about 30 weight percent of chromium oxide, at least about 2.0 wt. % of magnesium oxide, and aluminum oxide in the range of about nil to 10.0 weight percent.

9. The process of claim 1 provided with the step of passing said effluent gas stream from (2) through a fluidized bed of calcium-containing material and carbon-containing material thereby reducing the amount of sulfur-containing gases in the effluent gas stream.

10. The process of claim 9 provided with the steps of regenerating said fluidized bed by steam stripping; and desulfurizing the overhead steam stripped gaseous stream comprising $H_2O$, $H_2S$ and COS.

11. The process of claim 9 wherein said fluidized bed comprises about 85 to 95 wt. % of a calcium-containing material selected from the group of calcium-compounds consisting of oxides, hydroxide, carbonates, acetate, formate, hydride, nitrate, chloride, and mixtures thereof; and the remainder of said fluidized bed comprises a carbon-containing material selected from the group consisting of carbon, coal, petroleum coke, carbonaceous material that was entrained in the raw effluent gas stream from the reaction zone, and mixtures thereof.

* * * * *